US005424899A

United States Patent [19]

Scott et al.

[11] Patent Number: 5,424,899

[45] Date of Patent: Jun. 13, 1995

[54] COMPACT TRANSFORMER AND METHOD OF ASSEMBLING SAME

[75] Inventors: Gary W. Scott, Mt. Vernon; Paul J. Rustebakke, Cedar Rapids, both of Iowa

[73] Assignee: Square D Company, Palatine, Ill.

[21] Appl. No.: 969,646

[22] Filed: Oct. 30, 1992

[51] Int. Cl.[6] .................... H02B 1/08; H01F 41/02

[52] U.S. Cl. .................... 361/115; 361/93

[58] Field of Search .................... 335/18; 361/115, 93, 361/91, 357; 336/180, 184, 192, 198, 205, 216, 217, 234

[56] References Cited

U.S. PATENT DOCUMENTS

| | | | |
|---|---|---|---|
| 4,668,930 | 5/1987 | Francis | 336/18 |
| 4,884,048 | 11/1989 | Castonguay | 335/18 |
| 4,897,916 | 2/1990 | Blackburn | 336/216 |

*Primary Examiner*—Marc S. Hoff
*Assistant Examiner*—S. Jackson
*Attorney, Agent, or Firm*—Larry I. Golden; Kareem M. Irfan

[57] ABSTRACT

The present invention provides a compact transformer with a magnetic core having at least two leg members and two side members. Each leg member has two ends and a peripheral surface therebetween. Each side member has a generally planar body with at least two notches corresponding in cross-sectional shape and size to the end of each leg member. The sides of each notch surround and abut a majority of the peripheral surface near each leg member end. The leg member end is secured to each notch. A magnetically coupled primary and secondary winding is arranged around each leg member. The transformer is particularly useful in sending current signals to an electronic trip unit of a circuit interrupter.

The invention also includes a method of assembling a transformer which includes the steps of providing a magnetic core having at least two leg members with two ends and a peripheral surface therebetween and providing two side members of approximately the same shape having a generally planar body with at least two notches corresponding in cross-sectional shape and size to the end of each leg member. The method includes pressing and securing the peripheral surface near the end of each leg member against the sides of each notch so that the sides of each notch surround and abut a majority of the peripheral surface near each leg member end.

38 Claims, 2 Drawing Sheets

1/2

COMPACT TRANSFORMER AND METHOD OF ASSEMBLING SAME

FIELD OF THE INVENTION

The present invention relates a transformer core and coil assembly and more particularly, to a compact transformer which supplies power and senses current for an electronic trip unit of an electrical circuit interrupter.

BACKGROUND OF THE INVENTION

Transformers are used extensively used in all electrical and electronic applications. Transformers are useful to step voltages up or down, to couple signal energy from one stage to another, or for impedance matching. Other applications include magnetic circuits with solenoids and motor stators. There are single and multiphase potential transformers. There are current transformers for sensing current and powering electronic trip units for circuit interrupters such as circuit breakers and other electrical distribution devices.

One example of a circuit breaker current transformer assembly is described in U.S. Pat. Nos. 4,591,942 and 4,884,048 which patents are hereby incorporated by reference. The transformer assembly described therein senses a current overload condition and signals a static strip unit which provides thermal and magnetic response characteristics for the circuit breaker. The transformer is made of a laminated magnetic core with two bobbins containing a secondary winding of insulated wire and a primary winding or strap.

Ideally, the transformer assembly utilized by a circuit breaker with an electronic trip unit produces current, voltage and power from one or more phase currents connected to the circuit breaker to supply the circuit breaker electronic trip unit. The signal supplied to the trip unit for processing needs go be proportional to a wide range of phase currents. The electronic trip unit must also be isolated from potentially destructive voltage surges in any of the phases.

As the devices which carry the transformer become increasingly smaller themselves, there is a need to achieve these ideal characteristics in a more compact design. Furthermore, the space available is rarely designed with the transformer of primary concern. Thus, there is a need to have the flexibility of varying the design of the transformer to work around the other components in the device.

Having a limited size or uniformity of the available space causes many problems. For example, the coil bobbin of the transformer can be made longer only if the sides are made thinner. This requires additional laminations of magnetic material on the core sides to maintain a constant flux density along the magnetic path, More laminations, however, quickly offers diminishing returns as the increase in air gaps between the laminations acts to decrease the gain in flux density.

In view of the increasing size restriction for transformers, there is a need for a more compact transformer which increases the size of the coil bobbin without reducing the effectiveness of the magnetic core and allows the core size to also increase. There is another need for an inexpensively manufactured transformer which can modify its shape to use the maximum space available in a uniform or non-uniform enclosure.

SUMMARY OF THE INVENTION

According to the present invention, a compact transformer is provided which includes a magnetic core having at least two leg members and two side members. Each leg member has two ends and a peripheral surface therebetween. Each side member has a generally planar body with at least two notches corresponding in cross-sectional shape and size to the end of each leg member. Each notch is defined by sides within the body. The peripheral surface near the end of each leg member connects to the sides of each notch which surround and abut a majority of the peripheral surface near each leg member end. Means for securing the leg member end to each notch is also included.

The transformer further includes a primary winding arranged around each leg member. A secondary winding is also arranged around each leg member and magnetically coupled with the primary winding so that the magnetic lines of force of the primary winding intersect with the secondary winding.

Preferably, the magnetic core has two leg members of approximately the same length. Each leg member is generally rectangular and each side member is H-shaped. The end of each leg member connects to the notch defined by the bight portion of the H-shaped side member to abut three sides defining the peripheral surface near the leg member end. The leg member extends through the side member and is flush with the surface of the H-shaped side member.

The present invention also includes an electronic trip circuit interrupter which includes a molded plastic casing and an electronic signal processor. The processor determines overload current conditions within a protected circuit and provides an output signal to operate a pair of contacts to interrupt current flow through the circuit.

The interrupter further includes at least one current transformer within the case connected to the protected circuit and to the electronic signal processor for providing input signals in proportion to the current flow through the circuit. The transformer includes a magnetic core having at least two leg members of approximately equal length and two side members of approximately the same shape. Each leg member has two ends and a peripheral surface therebetween. Each side member has a generally planar body with at least two notches corresponding in cross-sectional shape and size to the end of each leg member. Each notch is defined by sides within the body. The peripheral surface near the end of each leg member connects to the sides of each notch to surround and abut a majority of the peripheral surface near each leg member end. The transformer also includes means for securing the leg member end to each notch and a primary winding arranged around each leg member. A secondary winding is also arranged around each leg member and magnetically coupled with the primary winding so that the magnetic lines of force of the primary winding intersect with the secondary winding.

The present invention also contemplates a method of assembling a transformer. The method includes the steps of providing a magnetic core having at least two leg members with two ends and a peripheral surface therebetween and providing two side members of approximately the same shape having a generally planar body with at least two notches corresponding in cross-sectional shape and size to the end of each leg member.

Each notch is defined by sides within the body. The method also includes the step of pressing and securing the peripheral surface near the end of each leg member against the sides of each notch. The sides of each notch surround and abut a majority of the peripheral surface near each leg member end.

Accordingly, an object of the present invention is to provide a transformer assembly which utilizes a longer coil winding shape within the same volume.

Another object of the invention is to provide a transformer assembly which increases the magnetic core cross-sectional area in the same volume.

A further object of the invention is to provide a transformer assembly which allows flexibility in the placement of the core and windings relative to one another to accommodate the volume available in the surrounding environment.

Yet another object of the invention is to provide a transformer which is more compact and electrically efficient than the prior art.

A still further object of the invention is to provide a transformer which is easier and less expensive to assemble.

Other and further advantages, embodiments, variations and the like will be apparent to those skilled in the art from the present specification taken with the accompanying drawings and appended claims.

BRIEF DESCRIPTION OF THE DRAWINGS

In the drawings, which comprise a portion of this disclosure.

DETAILED DESCRIPTION

Figure 1:
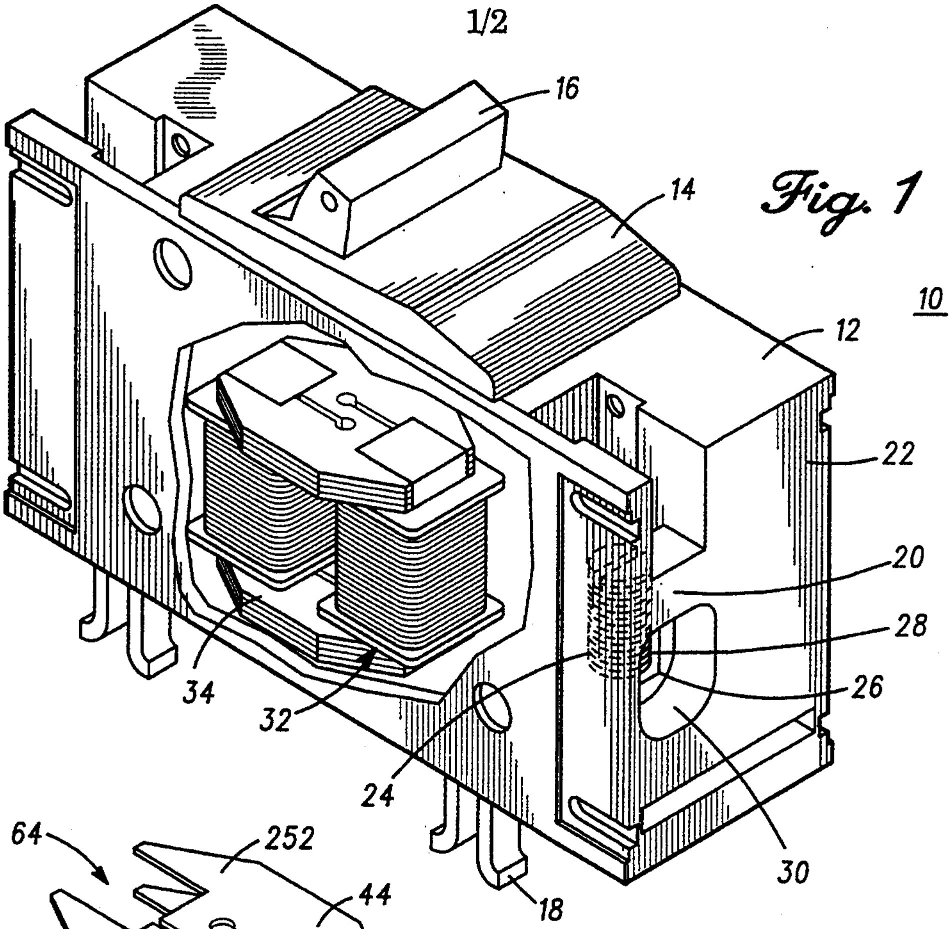
FIG. 1 is a perspective view of a circuit interrupter with a portion cut away to illustrate a transformer assembly of the present invention connected thereto.

An electronic trip circuit breaker 10 is depicted in FIG. 1 wherein the circuit breaker case 12 containing the components is sealed with a cover 14. The circuit breaker is operated with a handle 16 which projects through the cover 14. The circuit breaker 10 is a conventional type which is suitable for mounting on a panelboard with fasteners 18.

A terminal assembly 20 is mounted on the side walls 22 of the casing to provide the circuit breaker 10 with electrical connection to external load service or branch circuits. The terminal 20 includes a machine screw 24 carried by a lug body 26 having a suitably threaded surfaces 28 to engage the screw 24. The lug body 26 is provided with an aperture 30 which, together with other portions of the terminal assembly 20, provide for the connection of wire or cable conductors to the circuit breaker 10 by pinching the wire between the screw 24 and the bottom of the lug body 26. Other types of terminal assemblies, such as contact jaws (not shown), are utilized by the circuit breaker 10 depending on load size and mounting configurations of the panelboard or switchboard.

Figure 3:
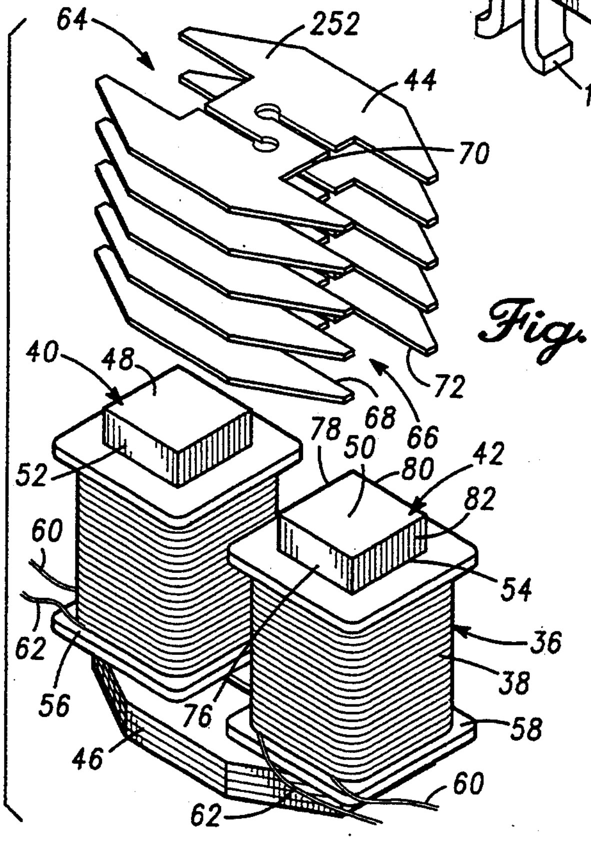
FIG. 3 is an enlarged perspective view of the transformer assembly of FIG. 2 with the top portion in an exploded disassembled view.
Figure 2:
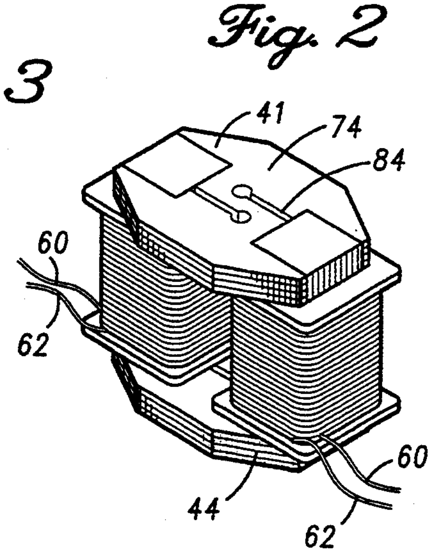
FIG. 2 is a perspective view of the transformer assembly of FIG. 1 removed from the circuit interrupter.

A transformer assembly 32 is connected to the terminal assembly 20 to complete the circuit between the load service and the branch circuits. As best illustrated in FIGS. 2 and 3, the transformer 32 includes a magnetic core 34 and a secondary winding 36 covered by a primary winding 38. The magnetic core 34 is constructed of at least two leg members 40, 42 connected between two side members 44, 48. Each leg member 40, 42 is defined by a generally rectangular shape having two ends, like 48 and 50, with a peripheral surface 52, 54 extending therefrom to the respective opposite leg member ends. Each end of the leg member 48 connects to the side member 44 along the peripheral surface 52 near the leg member's end 48.

The secondary winding 36 and the primary winding 38 are arranged around each of the leg members 40, 42. The primary winding 38 is magnetically coupled with the secondary winding 36 so that the magnetic lines of force of the primary winding 38 intersect with the secondary winding 36. Preferably, the secondary winding 38 is an insulated copper wire wound to form a coil around each bobbin 56, 58 and connected to leads 60 which are accessible for electrical connection to the remainder of the circuit. The primary winding 38 is similarly wound around each bobbin 56, 58 and over the coil formed by the secondary winding 36. The primary winding 38 also has leads 62 for electrical connection to the remainder of the circuit.

Other arrangements of the primary winding 38 and secondary winding 36 are suitable for use with the present invention. For example, the primary and secondary windings 38, 36 can be wound side by side or with different degrees of overlap. It is important to arrange the windings for efficient magnetic coupling between them. Furthermore, each leg member 40 can arrange the bobbin 58 to contain a complete, self-contained primary and secondary winding 38, 36, as will be discussed below, rather than having the windings from two bobbins 56 and 58 electrically connected together as is illustrated in FIGS. 1, 2, and 3.

The side members 44, 46 have an H-shaped, generally planar, polygon form. Each side member 44 has notches 64, 66 to position and connect to the leg member ends 48, 50. The size and shape of the notches 64, 66 correspond to the size and shape of the leg member ends 48, 50. Each notch 55 is defined by sides 68, 70, and 72 in the body 74 of the side member 44.

Each end of a leg member 42 is secured to the two side members 44, 46. The peripheral surface 54 near the leg member end 50 is defined by four faces 76, 78, 80, and 82. The three sides 68, 70, and 72 of the notch 66 respectively abut with three faces 76, 78, and 80 of the leg member end 50. In this manner, the notch sides 68, 70, and 72 surround and abut a majority of the peripheral surface 54 near the leg member end 50.

The connection between the leg member end 50 and the notch 66 is secured by an interference fit between the faces 76, 78, and 80 and the notch sides 68, 70, and 72. The interference fit is created by making the length of notch side 70 slightly smaller than the length of face 78 of the leg member end 50. This forces the notch sides 68 and 72, or the prongs of the H-shaped body 74, to spread slightly and provide a clamping force against the faces 76 and 80 of the leg member end 50. To provide some resilience to the notch sides 68 and 72, slits like 84 extend from the notch side 70 to assist the spreading of notch sides 68 and 70. As a result, the side member 44 abuts and surrounds a majority of the peripheral surface 54 the leg member end 50 so as to maximize the continuation of magnetic flux from the leg member 42 through the side member 46.

Other means for securing the leg members 40, 42 and side members 44, 46 of the magnetic core 34 are contemplated by the present invention. Any of a multitude of slit configurations will produce the desired clamp force and spring characteristic. Further, more than one slit can be cut from each notch. The slits 84 are preferably positioned so as not to interfere with the magnetic flux lines of the side members 44, 46.

Alternately, instead of forming the slits 84 in the side members 44, 46, the slits 84 are formed in the leg member ends like 48, 50. The interference fit is accomplished by squeezing together the prongs formed at the leg member's ends by each slit and inserting the leg member end into the slightly smaller sized notch. As the prongs of the leg member's end resiliently bend back to their former position, the interference fit is made.

Figure 4:
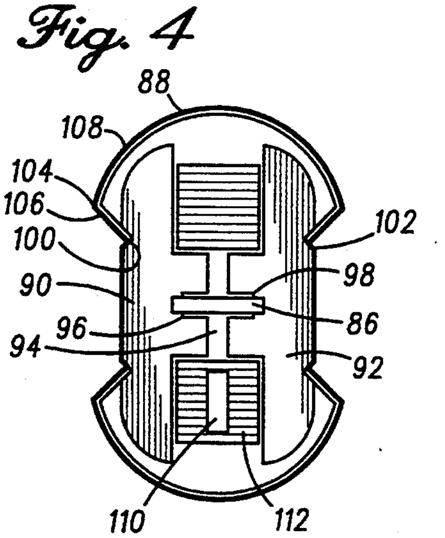
FIG. 4 is a top plan view of a transformer assembly similar to FIG. 2 with an alternate side member as part of the magnetic core.

Another securing means is provided by either an internal clamp 86 or external clamps 88 or both, as illustrated in FIG. 4. In this embodiment, the side member 46 is split in two halves 90, 92 by a gap 94. The internal clamp 86 fastens to slots 96 and 98 to pull together the two halves 90, 92 of the side member and close the gap 94. As the halves 90, 92 are pulled together, the notch sides 68 and 72 abut faces 76 and 80 of the leg member's end and securely squeeze the leg member end 50 therebetween as previously illustrated in FIG. 3.

The external clamps 88 connect to pairs of indentations 100, 102 in both halves 90, 92 of the side member. The ends 104 of the external clamp 88 have corresponding flanges 106 to engage the indentations 100, 102. The external clamp 88 has a flexible body 108 which exerts a securing force between the flanges 106 as the body 108 is bent to engage the indentations 100. One or more external clamps 88 can be suitably used in the present invention. Furthermore, the external clamp 88 can be used in combination with the internal clamp 86 described above.

FIG. 4 illustrates another securing means wherein a compressible wedge 110 is forcibly inserted into the end face 112 of leg member 44. As the magnetic material is split by the wedge 110, force is created against notch sides 68 and 70 to create the interference fit. Preferably, the magnetic material is formed in laminations which more easily allow for insertion of the wedge 110 therebetween.

Figure 5:
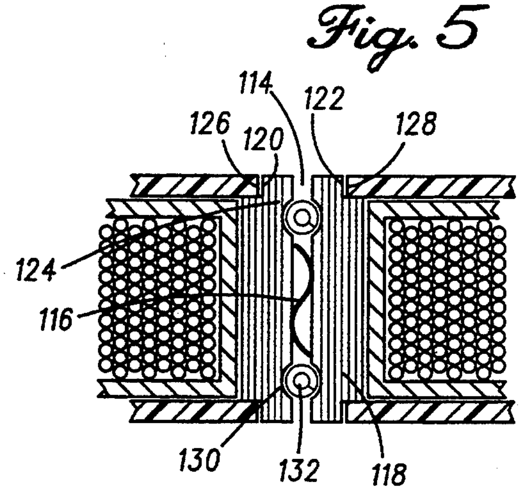
FIG. 5 is a cross-sectional view of a transformer assembly similar to FIG. 2 through the side of the bobbin, windings, and with an alternate leg member embodiment as part of the magnetic core.

Another securing means is illustrated in FIG. 5. A gap 114 is formed in a leg member 116 to accommodate a wave spring 116 which outwardly expands the laminations 118 comprising the leg member. Then the faces 120, 122 of the leg member end 124 abut the notch sides 126, 128 to provide an interference fit therebetween.

The expansive force can also be exerted by providing indentations 130 in the gap 114 which accommodate compressed spiral springs 132. As the spiral spring 132 decompresses, the face of laminations 118 of the leg member are forced outwardly in the same manner described above. The spiral springs 132 can be used alone or in combination with the wave spring 116 as illustrated. In this embodiment, the side members need not have the slits to form the interference fit.

Figure 6:
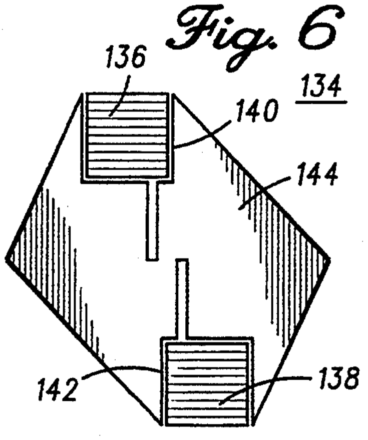
FIG. 6 is a top plan view of another embodiment of the present invention with non-uniform positioning of the magnetic core.

The present invention includes transformers like the embodiment 134 in FIG. 6 which have non-uniform dimensions. The position of leg members 136, 138 secured in notches 140, 142 is offset or skewed from the center axis of the side member 144. The same type of leg members, bobbins, and securing means previously described are used in this embodiment 134.

The embodiment 134 in FIG. 6 also illustrates the non-uniform shape of the side member 144. Although standard sizes are used for the bobbins and, accordingly, for the leg members 136, 138, the side member 144 is polygon shaped as a parallelpiped. The flexibility of positioning the leg members and varying the size and shape of both the leg and side members in the embodiments of the present invention are advantageous for non-uniform enclosed spaces.

Preferably, the present invention uses side members which have a generally polygonal shape modified with rounded edges to provide maximum overlap with the bobbins underneath as seen at the top and bottom of halves 90, 92 in FIG. 4. Furthermore, the preferred cross-sectional shape of the leg member is seen in FIG. 5 as 118 wherein each end is cut away like at side face 120 abutting the notch side 126.

The present invention also contemplates using leg members like 136 and 138 of different lengths to utilize off-shaped enclosures. The side members like 144 form a slanted plane to accommodate leg members of different lengths. The leg members can also have different cross-sectional shapes to assist in space utilization.

What has been described and illustrated heretofore are embodiments which can be specifically used as a single-phase, current transformer in combination with an electronic trip unit in a circuit breaker. The present invention also includes, but is not limited to, power transformers and multiple phase transformers.

Figure 7:
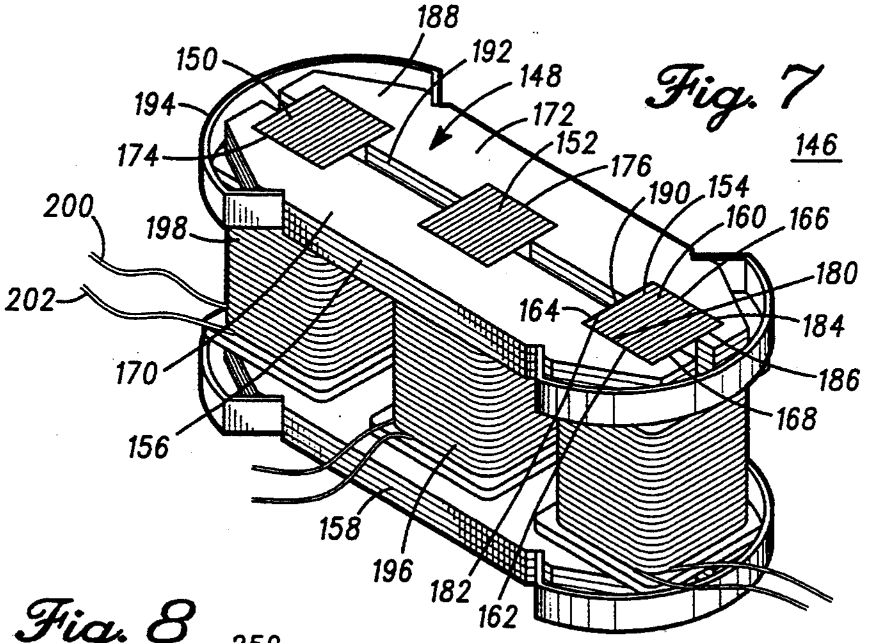
FIG. 7 is a perspective view of another embodiment of a transformer assembly of the present invention for multiphase applications.

As specifically illustrated in FIG. 7, another embodiment of the present invention includes a transformer assembly 146 for a multiphase application. The transformer 146 includes a magnetic core 148 constructed of three leg members 150, 152, and 154 connected between two side members 156, 158. The leg members like 154 have a generally rectangular shape. Each end of the leg members like 160 connects to the side member 156 along the four faces 162, 164, 166, and 168 of the leg member's end 160.

Each side member 156, 158 has a generally planar, elliptical form split into two halves 170, 172 with a series of three notches 174, 176, and 178 to position and connect to the ends of leg members 150, 152, and 154, respectively. The size and shape of the notches like 178 correspond to the size and shape of the leg member ends like 160. Each notch 178 is defined by sides 180, 182, 184, and 186 the body 188 of the side member 156.

Each end of a leg member 160 is secured to the two side members 156, 158. The peripheral surface 190 near the leg member end 160 is defined by four faces 162, 164, 166, and 168, and extends between the two ends of leg member 154. The four notch sides 180, 182, 184, and 186 respectively abut with four faces 162, 164, 166, and 168 of the leg member end 160. In this manner, the notch sides like 180 surround and abut a majority of the peripheral surface 190 near the leg member end 160.

The connection between the leg member end 160 and the notch 178 is secured by an interference fit between the faces like 162 and the notch sides like 180. The interference fit is created by making the length of notch side 182 slightly smaller than the length of face 164 of the leg member end 160. This forces the notch sides 180 and 184 to form a gap 192 between the two halves 170, 172. As a result, the side member 156 abuts and surrounds a majority of the peripheral surface 190 the leg member end 160 so as to maximize the continuation of magnetic flux from the leg member like 154 through the side members 156, 158.

The two halves 170, 172 of the side members like 156 are squeezed together by a external clamps 194 as previously described. The force exerted by the clamps 194 provides an interference fit between the faces like 162 and 166 of the leg member end 160 and the notch sides like 180 and 184.

Each of the three leg members like 154 extends through a bobbin 196. Each bobbin like 196 includes a primary winding 198 wound in a coil over a secondary winding (not seen). For each bobbin 196, leads like 200 are the two ends of the secondary winding and leads like 202 are the two ends of the primary winding 198. The leads 202, 200 for the primary and secondary windings on each leg member like 154 are connected to a separate phase in a three phase application.

Figure 8:
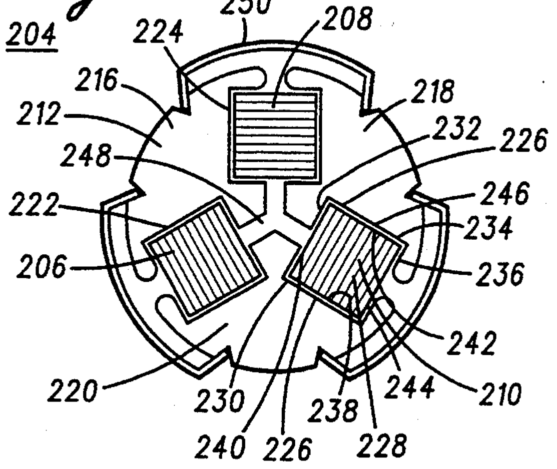
FIG. 8 is a top plan view of another embodiment of a transformer assembly of the present invention for multiphase applications.

Another embodiment of the present invention is illustrated in FIG. 8. A transformer assembly 204 for a three phase application is constructed in a similar manner just discussed. The arrangement of three leg members 206, 208, and 210 are in a circular configuration as compared to the series arrangement in FIG. 6. Each side member like 212 has a generally planar, circular form split into three equal thirds 218, 218, and 218. Notches 222, 224, and 228 are defined between each third piece to position and connect to the leg members 206, 208, and 210, respectively. The size and shape of the notches like 226 correspond to the size and shape of the leg member ends like 228. The sides 230, 232, 234, and 236 of the notches defined by the body of the side member 212 abut with the four faces 238, 240, 242, and 244 defined by the peripheral surface 246 near the leg member end 228, In order to provide an interference fit between the faces like 238 and 242 of the leg member end and the notch side 230 and 234, the length of notch side 232 is slightly smaller than the length of the face 240 of the leg member end. This creates a small gap 248 between each third of the side member 212. As a result, the side member 212 abuts and surrounds a majority of the peripheral surface 246 the leg member end 228 so as to maximize the continuation of magnetic flux from the leg member like 210 through the side member 212.

The three thirds 216, 218, and 220 of each side member like 212 are squeezed together by external clamps 250 as previously described. The force exerted by the clamps 50 provides an interference fit between the faces like 238 of the leg member end 228 and the notch side like 230.

Preferably, the leg members and side members in the above described embodiments are made of laminations like 252 in FIG. 3 formed from magnetic material. These laminations 252 are then held together by the interference fit connecting the leg members and the side members. As previously disclosed, the side members can have non-uniform shapes. Similarly, the pieces that the side members are split into, such as halves 90, 92 of FIG. 7 or thirds 216, 218, 220 of FIG. 8, need not be equal or uniform in size. Other types of magnetic cores such as, but not limited to, molded ferrite material is suitable for use with the present invention.

Although it is preferred that the notches 64, 66 extend through each lamination like 252, the present invention also contemplates having the notch extend through only a partial number of laminations joined together to comprise the side member. In this embodiment, the end of the leg member is not visible through the side member.

It is well known that air gaps between the lamination of a magnetic core decreases the magnetic flux between core laminations. The closer the laminations are held together, the less magnetizing current is required.

Preferably, the inventive transformer assemblies described above are made by using an interlock, embossing, or semi-pierce method of punching the leg and side members. The interlock method uses a die to produce a single stack of laminations from sheet material. The die makes a cut without completely removing the slug that is formed. Each lamination is then locked to the next by forcing the partially displaced slug from the first lamination into the cut of the second lamination. After a pre-determined number of laminations have been interlocked in this manner, the stack is removed from the die as a completed leg or side member. Separate dies are used for the leg and side members. Since a single stack of laminations is formed immediately, the time and expense of handling individual laminations is avoided.

Depending on the size of the laminations, an adhesive can be applied to the pole faces to avoid racking or sliding motion. The punched out notches in the side members are sized to create an interference fit when the leg members are inserted. To relieve the assembly stress of inserting the leg members into the side members and control the clamping pressure creating the interference fit, slits are simultaneously punched in the side members. The slits extend from the side opposite the open side of the notch. The length and shape of the slits determine the relationship between the clamp force and the interference fit.

The leg members are inserted through the center hole of the bobbins containing the primary and secondary windings. The leg members are then inserted into the side members in the manner previously described without the need for any secondary operations to be performed on the pole faces of the leg members.

The inventive method of making the transformer assemblies of the present invention avoids several problems involved with prior art methods. Assembly of laminated cores in the prior art involves interleaving laminations of different shapes together. The interleaving process is made more difficult because the laminations are fitted through the center hole of a bobbin. The laminations have pre-punched holes for inserting rivets. The rivet holes disrupt the magnetic flux density of the core. The thickness of prior art laminations must be uniform to allow for the interleaving process and the raw material strip from which the laminations are cut must also exhibit low variations in thickness.

Since the method of assembling the present invention does not interleave laminations, the thickness of the laminations for the side members can be different than the leg members. Even variations in thickness from layer to layer will not reduce the effectiveness of the magnetic path through the core. Pre-punched holes and fasteners through the laminations disrupting the magnetic flux are avoided. There is no need to handle individual laminations as with the interleaving process. The fit of the laminations through the center hole of the bobbin is much tighter as well.

The method of assembling the present invention is particularly useful for making transformers which have non-uniform dimensions. The advantage allows use of the inventive transformer in non-uniform or oddly shaped enclosures. The present invention allows the transformer to be designed around other components in the enclosure. For example, the position of the leg members can be offset or skewed. The same leg members and bobbins are used. The notches in the side members are simply offset or staggered. The outline of the transformer's volumetric circumference becomes non-rectangular, prismatic, or polyhedral. Since space usage is an important criteria within an enclosure, this advantage is quite valuable.

The present invention allows the cross-sectional area and shape of the leg member to be varied independently of the side member. The cross-sectional area of the leg member is optimized for the desired characteristics of the transformer such as power capacity, flux density, coil bobbin shape, and electrical efficiency.

For the same enclosed volume, the inventive transformer allows greater coil volume than the prior art. The side members of the inventive transformer are shaped to conduct magnetic flux radiating away from the leg member ends. The side members are made thinner but wider in cross-section by comparison to the prior art cores while conducting at least the same flux. The thinner side members allow the use of longer bobbins of the same cross-sectional width equaling a greater coil volume.

The inventive transformer also allows greater core volume for the same enclosed volume. The present invention allows a reduction in bobbin cross-sectional width in order to increase the cross-sectional area of the magnetic core. The decrease in cross-sectional width of the bobbin is compensated by increasing the length of the bobbin.

Although a circuit breaker has been specifically illustrated herein, the present invention contemplates uses in a variety of other electrical circuit interrupters and electrical distribution devices. The applications of the inventive transformers are not as limited to the illustrations herein.

The following Example is set forth for the purposes of illustration and should not be construed as limiting.

EXAMPLE

The performance of a transformer assembly of the present invention utilized within an electronic trip unit was compared to a conventional current transformer used in a commercially available 250 Amp circuit breaker. The conventional transformer design utilizes 28 U-shaped and 28 l-shaped laminations riveted together. The laminations are about 0.025 inch thick. Two bobbins, one on each prong of the U-shaped laminations, each had a turn ratio of about 1350:1 with about #29 AWG insulated wire for the windings located thereon. The cross-sectional area of the secondary winding was about 0.08 sq. in. and the mean wire length was about 3.33 inches with a coil resistance of about 14.2 Ohms. Each bobbin had a rectangular cross-section for the core measuring about 0.80 by 0.475 inches. The outer edges of the bobbin flanges were about 1.50 by 1.14 inches. The width of the bobbin was about 0.63 inches with a wall thickness of 0.035 inches. The height of the complete conventional transformer assembly was about 2.27 inches and the width was about 1.05 inches. The minimal core area was about 0.141 sq, in, located on the sides of the core.

A set of three inventive transformer assemblies were prepared. Each inventive transformer assembly utilized 22 H-shaped (11 laminations for each side member) and 24 generally rectangular shaped laminations (12 laminations for each of two legs) connected together with an interference fit as previously described. The laminations are about 0.025 inch thick. Two bobbins, one on each of two legs formed by the generally rectangular shaped laminations, each had a turn ratio of about 1000:1 with about #32 AWG insulated wire for the windings located thereon. The cross-sectional area of each secondary winding was about 0.1 sq. in. and the mean wire length was about 2.08 inches with a coil resistance of about 29.3 Ohms. Each bobbin had a rectangular cross-section for the core measuring about 0.35 by 0.35 inches. The outer edges of the bobbin flanges were about 0.7 by 0.7 inches. The width of the bobbin was 0.78 inches with a wall thickness of 0.015 inches. The height of the complete inventive transformer assembly was about 1.55 inches and the width was about 1.07 inches. The minimal core area was about 0.115 sq. in, Comparing the dimensions noted above, the inventive transformer is about 50% more compact with about 25% more cross-sectional winding area. The mean wire length of the inventive transformer is about 36% less than the conventional transformer. Thus, the inventive transformer provided a greater winding cross-sectional area in less volume. The inventive transformer has numerous advantages over the conventional transformer and, as will be described below, still performs at least as well in an electronic trip circuit.

For the comparative tests, a set of three inventive transformers was installed on each of three phases of a 250 amp circuit breaker and were connected to a 12 volt, 15 ma. electronic trip system to measure their performance. On the same circuit, a 250 amp circuit breaker utilizing a conventional transformer on each of three phases was measured on a 10 volt, 18 ma. electronic trip system. Signals were monitored on the rating plug resistors. A Pearson brand current transformer was used as a reference to monitor the sum of all phase currents. A ground fault summing scheme was tested by connecting one secondary lead from each transformer through a QOGFI toroid coil.

During the comparative tests, the worse case signal error was measured with three phase currents. The rms phase accuracy of the transformers was within 5% error band from 95 to 2600 amps and a 10% error band from 42 to 3000 amps. When a balanced output current from each transformer was summed with a QOGFI toroid, a third harmonic error signal was detected due to saturation effects. The amplitude of this error measured 4 amps at rated current, amps at 600 amps and 50 amps at 1200 phase amps. Above 600 amps, a first cycle peak ground fault was detected due to direct current offset currents in the circuit.

One of the inventive transformer was tested as a single phase current transformer to confirm that the worse case signal error was smaller than in three phase operation. When an inventive transformer was connected to the B-phase without any current flowing through the phase, the maximum false current recorded was still under three amps even at 3000 amps in phases A and C. This confirmed a minimum amount of crosstalk between adjacent phases.

The performance of the inventive transformer connected to a simulated trip circuit was compared to the Spectra transformer. The inventive transformer performed with slightly higher accuracies above about 42 amps. For the anticipated current range of 50 to 3000 amps, the Spectra transformer accuracy fell in a 7.5% error band compared to a 5.3% error band for the inventive transformer. For both transformers, the ground fault summing toroid detected a 3 to 7 amp error up to 600 amps with a three phase current and 20 amps error at 1200 amps. This ground fault summing technique indicated the need to desensitize the ground fault signal for both transformers at higher amps.

The phase current and ground fault accuracy performance of the inventive transformers is presented in Table 1 below and compared with the Spectra transformers performance in Table 2. Column 1 of the Tables is the primary coil current in amps rms. Columns 2–4 are the secondary coil currents for each of the three phases. Column 5 is the current of the Pearson ground current reference transformer, Column 6 is the ground fault current through the QOGFI detector. Column 7 is the peak ground fault current of the first cycle measured by the QOGFI toroid. Columns 8–10 are the individual phase error in percentages with an average error percentage.

without departing from the spirit and scope of the invention as defined in the appended claims.

What is claimed is:

1. A compact transformer comprising:

a magnetic core having at least two leg members and two side members, each leg member having two ends and a peripheral surface therebetween, each side member having a generally planar body with at least two notches corresponding in cross-sectional shape and size to the end of each leg member, each notch defined by sides within the body, the peripheral surface near the end of each leg member connects to the sides of each notch, the sides of each notch surround and abut a majority of the peripheral surface near each leg member end;

means for securing the leg member end to each notch;

a primary winding arranged around each leg member; and a secondary winding arranged around each leg member and magnetically coupled with the primary winding so that the magnetic coupled with the primary winding so that the magnetic lines of force of the primary winding intersect with the secondary winding, each one of the primary and secondary windings having at least one end being positioned adjacent one of the side members.

2. The transformer of claim 1 wherein the magnetic core has two leg members of approximately the same length, each leg member being generally rectangular

TABLE 1

| PRI | SECONDARY mA rms | | | *PEARSON | GF | GF SPIKE | 3 phase error % PHASE A | | | |
|---|---|---|---|---|---|---|---|---|---|---|
| A rms | A | B | C | A rms | A rms | A pk | A | B | C | AVG |
| 25 | 8.3 | 10.4 | 9.8 | 3.78 | 7.18 | | −33.90 | −17.01 | −22.11 | −24.34 |
| 51 | 23.2 | 25.1 | 25.1 | 0 | 6.81 | | −8.98 | −1.71 | −1.45 | −4.05 |
| 105 | 51.5 | 53.5 | 49.7 | 5.31 | 5.20 | | −1.90 | −1.90 | −5.33 | −1.78 |
| 206 | 102.0 | 104.1 | 104.2 | 24.3 | 3.69 | | −1.02 | 1.07 | 1.17 | 0.40 |
| 306 | 154.2 | 155.9 | 155.5 | 42.3 | 5.22 | | 0.65 | 1.73 | 1.50 | 1.29 |
| 408 | 201.0 | 204.5 | 204.5 | 17.2 | 5.67 | | −1.47 | 0.25 | 0.25 | −0.33 |
| 509 | 252.5 | 254.0 | 253.0 | 34.5 | 5.94 | 10 | −0.79 | −0.20 | −0.59 | −0.52 |
| 607 | 301.0 | 303.0 | 301.5 | 17.4 | 6.90 | 12 | −0.82 | −0.16 | −0.66 | −0.55 |
| 992 | 492.5 | 497.0 | 497.0 | 42.5 | 15.89 | 376 | −0.71 | 0.20 | 0.20 | −0.10 |
| 1945 | 963.5 | 993.5 | 978.5 | 157 | 70.68 | 1963 | −0.93 | 2.16 | 0.62 | 0.62 |
| 2568 | 1250.5 | 1252.0 | 1255.0 | 31.4 | 523.16 | 2772 | −2.61 | −2.49 | −2.26 | −2.45 |

TABLE 2

| PRI | SECONDARY mA rms | | | PEARSON | GF | GF SPIKE | 3 phase error % PHASE A | | | |
|---|---|---|---|---|---|---|---|---|---|---|
| A rms | A | B | C | mA rms | A rms | A pk | A | B | C | AVG |
| 25 | 14.1 | 16.0 | 15.8 | 3.34 | 4.86 | | −24.38 | −13.78 | −14.78 | −17.65 |
| 51 | 32.9 | 36.3 | 36.1 | 4.62 | 2.75 | | −12.86 | −4.02 | −4.35 | −7.08 |
| 105 | 73.5 | 76.5 | 72.8 | 5.41 | 2.46 | | −5.63 | −1.81 | −6.57 | −4.67 |
| 206 | 148.4 | 151.5 | 151.9 | 55.25 | 3.35 | | −2.77 | −0.73 | −0.44 | −1.31 |
| 309 | 225.7 | 226.2 | 229.0 | 42.3 | 4.44 | | −1.39 | −1.17 | 0.03 | −0.84 |
| 408 | 300 | 303 | 303 | 15.3 | 13.56 | | −0.74 | 0.25 | 0.25 | −0.08 |
| 508 | 372 | 374 | 373 | 37.9 | 7.81 | 11 | −1.18 | −0.59 | −0.79 | −0.85 |
| 607 | 446 | 446 | 445 | 17.3 | 13.89 | 20 | −0.82 | −0.82 | −0.99 | −0.88 |
| 991 | 735 | 741 | 736 | 43 | 34.41 | 349 | 0.10 | 0.91 | 0.30 | 0.44 |
| 1932 | 1406 | 1437 | 1418 | 157 | 323.01 | 1263 | −1.76 | 0.41 | −0.93 | −0.76 |
| 2443 | 1702 | 1773 | 1735 | 467 | 731.49 | 1662 | −5.94 | −2.05 | −4.13 | −4.04 |

While particular embodiments and applications of the present invention have been illustrated and described, it is to be understood that the invention is not limited to the precise construction and compositions disclosed herein and that various modifications, changes, and variations which will be apparent to those skilled in the art may be made in the arrangement, operation, and details of construction of the invention disclosed herein and each side member being H-shaped, the end of each leg member connecting to the notch defined by the bight portion of the H-shaped side member to abut three sides defining the peripheral surface near the leg member end, the leg member end extending into the side member and being flush with the surface of the H-shaped side member.

3. The transformer of claim 1 wherein the magnetic core includes three leg members, each leg member having a generally rectangular shape and each side member having a generally circular shape, each side member having three notches positioned equidistant around the circumference of the side member, the transformer further including three pairs of primary and secondary windings, each leg member having a pair of windings located thereon, each pair of windings having leads for electrical connection to a separate phase.

4. The transformer of claim 1 wherein the magnetic core includes three leg members, each leg member having a generally rectangular shape and each side member having a generally elliptical shape, each side member having three notches positioned in series across the length of the elliptically shaped side member, the transformer further including three pairs of primary and secondary windings, each leg member having a pair of windings located thereon, each pair of windings having leads for electrical connection to a separate phase.

5. The transformer of claim 1 wherein the cross-sectional area of the leg members is not equal to the cross-sectional area of the side members.

6. The transformer of claim 1 wherein the magnetic core is made of laminated magnetic material.

7. The transformer of claim 1 wherein the magnetic core is made of a molded ferrite material.

8. The transformer of claim 1 wherein each notch extends through the entire cross-sectional thickness of the side member.

9. The transformer of claim 1 wherein each notch extends partially through the cross-sectional thickness of the side member.

10. The transformer of claim 1 wherein the securing means includes connecting the leg members to the side members with an interference fit between the peripheral surface of the leg members and the sides of the notches.

11. The transformer of claim 10 wherein the securing means further includes a plurality of slits formed in the side members, at least one slit extending from each notch partially across the side member to allow bending of opposed sides of the notch to fit therebetween the peripheral surface near the end of the leg member with an interference fit.

12. The transformer of claim 10 wherein the securing means further includes a plurality of gaps formed in the side members, one of the gaps extending from each notch entirely across the side member to split the side member into multiple pieces, the gaps allow abutting the opposed sides of the notch to fit therebetween the peripheral surface near the end of the leg member with an interference fit, the securing means also including an external clamp exerting a pulling force between the pieces of the side member to squeeze the leg member ends between the sides of each notch, the external clamp having an elongated resilient body with flanges on each end, each side member having indentations spaced apart along the edges thereof, the indentations being shaped and positioned to engage the flanges of the resilient body and exert the pulling force between the pieces of the side member.

13. The transformer of claim 10 wherein the securing means further includes a plurality of gaps formed in the side members, one of the gaps extending from each notch entirely across the side member to split the side member into multiple pieces, the gaps allow abutting the opposed sides of the notch to fit therebetween the peripheral surface near the end of the leg member with an interference fit, the securing means also including an internal clamp exerting a pulling force between the pieces of the side member to squeeze the leg member ends between the sides of each notch, the internal clamp having an elongated resilient body with fasteners on each end, each side member having slots spaced apart along the gaps therein, the slots being shaped and positioned to engage the fasteners of the resilient body and exert the pulling force between the pieces of the side member.

14. The transformer of claim 10 wherein the securing means includes a plurality of wedges of magnetic material, one of the wedges forcibly inserted into the end face of each leg member so that the peripheral surface near the leg member end is forcibly pushed towards the abutting sides of the corresponding notch.

15. The transformer of claim 10 wherein the securing means further includes a gap formed in each leg member, the gap extending the length of the leg member from end to end splitting the leg member into two pieces, the gap allows the opposed sides of the notch to abut therebetween the peripheral surface near the end of the leg member with an interference fit, the securing means also including a spring exerting a separating force in the gap between the pieces of the leg member to squeeze the leg member ends between the sides of each notch.

16. The transformer of claim 15 wherein the spring is defined by a resilient body having an elongated curve shape, the spring positioned lengthwise in the gap to exert a separating force between the pieces of the leg member.

17. The transformer of claim 15 wherein the spring is defined by a plurality of resilient bodies each having a coiled shape, each leg member having indentations spaced apart along the edges of the gap therein, the indentations being shaped and positioned to engage the plurality of bodies and exert the separating force between the pieces of the leg member.

18. The transformer of claim 1 wherein the magnetic core has two leg members, each leg member being generally rectangular and each side member having a generally polygonal shape, the end of each leg member connecting to the notch defined in opposite ends of the polygonal shaped side member to abut at least three sides defining the peripheral surface near the leg member end, the leg member end extending into the side member.

19. The transformer of claim 18 wherein the notches are positioned offset from a center axis dividing the length of the side member.

20. The transformer of claim 19 wherein the side member has a shape of a parallelpiped.

21. An electronic trip circuit interrupter comprising:
- a molded plastic casing;
- an electronic signal processor for determining overload current conditions within a protected circuit and for providing an output signal to operate a pair of contacts to interrupt current flow through the circuit;
- at least one current transformer within the case connected to the protected circuit and to the electronic signal processor for providing input signals in proportion to the current flow through the circuit;
- the transformer including a magnetic core having at least two leg members and two side members, each leg member having two ends and a peripheral surface therebetween, each side member having a generally planar body with at least two notches corresponding in cross-sectional shape and size to the end of each leg member, each notch defined by sides within the body, the peripheral surface near the end of each leg member connects to the sides of each notch, the sides of each notch surround and abut a majority of the peripheral surface near each leg member end;

means for securing the leg member end to each notch;

a primary winding arranged around each leg member; and a secondary winding arranged around each leg member and magnetically coupled with the primary winding so that the magnetic lines of force of the primary winding intersect with the secondary winding, each one of the primal and secondary windings having at least one end being positioned adjacent one of the side members.

22. The transformer of claim 21 wherein the magnetic core is made of laminated magnetic material.

23. The circuit interrupter of claim 21 wherein the magnetic core has two leg members of approximately the same length, each leg member being generally rectangular and each side member being H-shaped, the end of each leg member connecting to the notch defined by the bight portion of the H-shaped side member to abut three sides defining the peripheral surface near the leg member end, the leg member end extending into the side member and being flush with the surface of the H-shaped side member.

24. The circuit interrupter of claim 21 wherein the magnetic core includes three leg members, each leg member having a generally rectangular shape and each side member having a generally circular shape, each side member having three notches positioned equidistant around the circumference of the side member, the transformer further including three pairs of primary and secondary windings, each leg member having a pair of windings located thereon, each pair of windings having leads for electrical connection to a separate phase.

25. The circuit interrupter of claim 21 wherein the magnetic core includes three leg members, each leg member having a generally rectangular shape and each side member having a generally elliptical shape, each side member having three notches positioned in series across the length of the elliptically shaped side member, the transformer further including three pairs of primary and secondary windings, each leg member having a pair of windings located thereon, each pair of windings having leads for electrical connection to a separate phase.

26. The circuit interrupter of claim 21 wherein the magnetic core has two leg members, each leg member being generally rectangular and each side member having a generally polygonal shape, the end of each leg member connecting to the notch defined in opposite ends of the polygonal shaped side member to abut at least three sides defining the peripheral surface near the leg member end, the leg member end extending into the side member,

27. The circuit interrupter of claim 26 wherein the notches are positioned offset from a center axis dividing the length of the side member.

28. The circuit interrupter of claim 21 wherein the securing means includes connecting the leg members to the side members with an interference fit between the peripheral surface of the leg members and the sides of the notches.

29. The circuit interrupter of claim 28 wherein the securing means further includes a plurality of slits formed in the side members, at least one slit extending from each notch partially across the side member to allow bending of opposed sides of the notch to fit therebetween the peripheral surface near the end of the leg member with an interference fit.

30. The transformer of claim 28 wherein the securing means further includes a plurality of gaps formed in the side members, one of the gaps extending from each notch entirely across the side member to split the side member into multiple pieces, the gaps allow abutting the opposed sides of the notch to fit therebetween the peripheral surface near the end of the leg member with an interference fit, the securing means also including an external clamp exerting a pulling force between the pieces of the side member to squeeze the leg member ends between the sides of each notch, the external clamp having an elongated resilient body with flanges on each end, each side member having indentations spaced apart along the edges thereof, the indentations being shaped and positioned to engage the flanges of the resilient body and exert the pulling force between the pieces of the side member.

31. The circuit interrupter of claim 28 wherein the securing means further includes a plurality of gaps formed in the side members, one of the gaps extending from each notch entirely across the side member to split the side member into multiple pieces, the gaps allow abutting the opposed sides of the notch to fit therebetween the peripheral surface near the end of the leg member with an interference fit, the securing means also including an internal clamp exerting a pulling force between the pieces of the side member to squeeze the leg member ends between the sides of each notch, the internal clamp having an elongated resilient body with fasteners on each end, each side member having slots spaced apart along the gaps therein, the slots being shaped and positioned to engage the fasteners of the resilient body and exert the pulling force between the pieces of the side member.

32. The circuit interrupter of claim 28 wherein the securing means further includes a gap formed in each leg member, the gap extending the length of the leg member from end to end splitting the leg member into two pieces, the gap allows the opposed sides of the notch to abut therebetween the peripheral surface near the end of the leg member with an interference fit, the securing means also including a spring positioned in the gap which exerts a separating force in the gap between the pieces of the leg member to squeeze the leg member ends between the sides of each notch.

33. The transformer of claim 28 wherein the securing means includes a plurality of wedges of magnetic material, one of the wedges forcibly inserted into the end face of each leg member so that the peripheral surface near the leg member end is forcibly pushed towards the abutting sides of the corresponding notch.

34. A method of assembling a transformer, the method including the steps of:

providing a magnetic core having at least two leg members with two ends and a peripheral surface therebetween;

providing two side members of approximately the same shape having a generally planar body with at least two notches corresponding in cross-sectional shape and size to the end of each leg member, each notch defined by sides within the body; and pressing and securing the peripheral surface near the end of each leg member against the sides of each notch, the sides of each notch surround and abut a majority of the peripheral surface near each leg member end.

35. The method of claim 34 wherein the providing steps further include the step of:

interlocking a plurality of magnetic material laminations into the shape of the leg members; and interlocking a plurality of magnetic material laminations into the shape of the side members.

36. The method of claim 34 wherein the pressing step further includes:

forming a plurality of slits in the side members with at least one slit extending from each notch partially across the side member and bending the opposed sides of the notch to fit therebetween the peripheral surface near the end of the leg member with an interference fit.

37. The method of claim 34 wherein the pressing step further includes:

forming a plurality of gaps in the side members with at least one of the gaps extending from each notch entirely across the side member to split the side member into multiple pieces and clamping the side member pieces together to abut and squeeze the peripheral surface near the end of each leg member between the opposed sides of each notch.

38. The method of claim 34 wherein the pressing step further includes:

forming a plurality of wedges of magnetic material and forcibly inserting one of the wedges into the end face of each leg member so that the peripheral surface near the leg member end is forcibly pushed towards the abutting sides of the corresponding notch.

* * * * *